US008872373B2

(12) United States Patent
Rentschler et al.

(10) Patent No.: US 8,872,373 B2
(45) Date of Patent: Oct. 28, 2014

(54) SWITCHING DEVICE, STARTING DEVICE, AND METHOD FOR AN ELECTROMAGNETIC SWITCHING DEVICE

(75) Inventors: Simon Rentschler, Chang sha (CN); Duraisamy Sakthivadivel, Tiruppurldt (IN); Harald Schueler, Backnang (DE); Sven Hartmann, Stuttgart (DE); Juergen Gross, Stuttgart (DE); Stefan Tumback, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 73 days.

(21) Appl. No.: 13/637,912

(22) PCT Filed: Mar. 16, 2011

(86) PCT No.: PCT/EP2011/053927
§ 371 (c)(1), (2), (4) Date: Dec. 10, 2012

(87) PCT Pub. No.: WO2011/124450
PCT Pub. Date: Oct. 13, 2011

(65) Prior Publication Data

US 2013/0088011 A1 Apr. 11, 2013

(30) Foreign Application Priority Data

Mar. 30, 2010 (DE) ......................... 10 2010 003 485

(51) Int. Cl.

| | |
|---|---|
| ***F02N 11/08*** | (2006.01) |
| ***H02P 9/04*** | (2006.01) |
| ***H01H 47/22*** | (2006.01) |
| ***H01H 36/00*** | (2006.01) |
| *H01H 67/02* | (2006.01) |
| *H01H 51/06* | (2006.01) |
| *H01H 47/08* | (2006.01) |

(52) U.S. Cl.
CPC ............. *H01H 36/00* (2013.01); *F02N 11/087* (2013.01); *H01H 47/22* (2013.01); *F02N 11/0855* (2013.01); *F02N 2200/065* (2013.01); *F02N 2011/0892* (2013.01); *H01H 51/065* (2013.01); *H01H 47/08* (2013.01)
USPC ............................ 290/48; 335/126; 290/38 R

(58) Field of Classification Search
USPC .................... 290/38 R, 48; 335/126; 123/179
See application file for complete search history.

(56) References Cited

U.S. PATENT DOCUMENTS 4,415,812 A * 11/1983 Griffith et al. .............. 290/38 R
4,488,054 A * 12/1984 Ebihara ....................... 290/38 A
(Continued)

FOREIGN PATENT DOCUMENTS

DE 41 01 411 1/1992
DE 10 2004 032373 1/2006
(Continued)

OTHER PUBLICATIONS

International Search Report for PCT/EP2011/053927, dated May 15, 2012.

*Primary Examiner* — Pedro J Cuevas
(74) *Attorney, Agent, or Firm* — Kenyon & Kenyon LLP

(57) ABSTRACT

A switching device has an electromagnetic switching element and a controller, the switching element including two coils on one core which act on a shared armature. In order to implement an operation of the armature to be activatable as rapidly and simply as possible with low power consumption, the controller is designed to have a switch in the current path of the coil in each case to activate each coil.

6 Claims, 5 Drawing Sheets

(56) References Cited

U.S. PATENT DOCUMENTS

| | | | | |
|---|---|---|---|---|
| 4,559,455 | A * | 12/1985 | Tanaka | 290/38 R |
| 4,737,654 | A * | 4/1988 | Morishita et al. | 290/48 |
| 4,906,857 | A * | 3/1990 | Cummins et al. | 290/38 R |
| 5,398,724 | A * | 3/1995 | Vars et al. | 137/625.33 |
| 5,656,981 | A * | 8/1997 | Niimi et al. | 335/126 |
| 5,679,935 | A * | 10/1997 | Baba et al. | 200/17 R |
| 5,892,422 | A * | 4/1999 | Montaigu et al. | 335/126 |
| 5,909,067 | A * | 6/1999 | Liadakis | 310/14 |
| 6,049,263 | A * | 4/2000 | Vilou | 335/126 |
| 6,148,781 | A * | 11/2000 | Boegner et al. | 123/179.3 |
| 6,404,310 | B1 * | 6/2002 | Ando et al. | 335/133 |
| 6,851,405 | B2 * | 2/2005 | Kajino et al. | 123/179.25 |
| 6,863,041 | B2 * | 3/2005 | Nagai et al. | 123/179.25 |
| 6,938,599 | B2 * | 9/2005 | Senda et al. | 123/179.3 |
| 7,034,643 | B1 * | 4/2006 | Kusumoto et al. | 335/126 |
| 7,973,623 | B2 * | 7/2011 | Andoh | 335/126 |
| 8,055,460 | B2 * | 11/2011 | Rajagopalan et al. | 702/58 |
| 8,169,281 | B2 * | 5/2012 | Andoh | 335/126 |
| 8,299,639 | B2 * | 10/2012 | Usami et al. | 290/38 R |
| 8,416,039 | B2 * | 4/2013 | Bradfield | 335/126 |
| 8,476,997 | B2 * | 7/2013 | Hrnjak et al. | 335/126 |
| 8,733,190 | B2 * | 5/2014 | Palfai et al. | 74/7 C |
| 8,754,556 | B2 * | 6/2014 | Haruno et al. | 310/71 |
| 2004/0168666 | A1 * | 9/2004 | Nagai et al. | 123/179.25 |
| 2006/0201266 | A1 * | 9/2006 | Kajino et al. | 74/6 |
| 2007/0139146 | A1 * | 6/2007 | Kusumoto et al. | 335/131 |
| 2007/0284234 | A1 * | 12/2007 | Kurasawa et al. | 200/400 |
| 2008/0024253 | A1 * | 1/2008 | Kurasawa et al. | 335/196 |
| 2008/0048454 | A1 * | 2/2008 | Kurasawa et al. | 290/48 |
| 2009/0026896 | A1 * | 1/2009 | Andoh | 310/68 R |
| 2009/0027147 | A1 * | 1/2009 | Andoh | 335/196 |
| 2010/0217545 | A1 * | 8/2010 | Rajagopalan et al. | 702/58 |
| 2011/0193435 | A1 * | 8/2011 | Andoh | 310/83 |
| 2012/0068475 | A1 * | 3/2012 | Bradfield | 290/38 R |
| 2012/0068476 | A1 * | 3/2012 | Bradfield | 290/38 R |
| 2012/0068477 | A1 * | 3/2012 | Bradfield | 290/38 R |
| 2012/0186551 | A1 * | 7/2012 | Rentschler et al. | 123/179.3 |
| 2013/0027157 | A1 * | 1/2013 | Niimi et al. | 335/2 |
| 2013/0049819 | A1 * | 2/2013 | Hartmann et al. | 327/110 |
| 2013/0070375 | A1 * | 3/2013 | Schueler et al. | 361/54 |
| 2013/0088011 | A1 * | 4/2013 | Rentschler et al. | 290/48 |
| 2013/0167790 | A1 * | 7/2013 | Bradfield et al. | 123/179.25 |

FOREIGN PATENT DOCUMENTS

| | | |
|---|---|---|
| DE | 10 2006 011 644 | 9/2007 |
| EP | 0 627 763 | 12/1994 |
| EP | 0 848 159 | 6/1998 |
| WO | WO 2008/099731 | 1/2008 |
| WO | WO 2010/015450 | 2/2010 |

* cited by examiner

SWITCHING DEVICE, STARTING DEVICE, AND METHOD FOR AN ELECTROMAGNETIC SWITCHING DEVICE

BACKGROUND OF THE INVENTION

1. Field of the Invention

The present invention relates to a switching device having an electromagnetic switching element and a controller, the switching element including two coils on one core which act on a shared armature. Furthermore, the present invention relates to a starting device for an internal combustion engine, in particular for a motor vehicle, having a starter motor, a coupling device for temporarily coupling the starter motor to the internal combustion engine, and a starter controller. Furthermore, the present invention relates to a method for an electromagnetic switching device, having a switching element and a controller, two coils on one core being activated by the controller while acting on a shared armature.

2. Description of the Related Art

Electromagnets, relays, and transformers or similar inductive loads are known, having windings on a core, which are switched as inductive loads.

Furthermore, a starter relay having the double function of a switching and meshing relay in a starting device for meshing a starter pinion with the ring gear of an internal combustion engine and for activating a starter motor is known, in order to crank an internal combustion engine.

A switching principle is known in starting devices, according to which a pull-in winding and a hold-in winding are situated on a core, in order to mesh a starter pinion driven by the starter motor with a ring gear of the internal combustion engine using a high starting power and a high starting velocity and to switch the starter motor using a maximum current. Using the hold-in winding, the starter relay is held in the closed state, while the current for the pull-in winding is reduced. The hold-in winding is directly connected to the vehicle chassis ground. In contrast, the pull-in winding is connected via the starter motor to the vehicle chassis ground. When the switch for the starter motor on the starter relay is closed and the starter motor has started, the pull-in current is reduced, since the positive pole potential of the starter battery is now directly connected to the starter motor. In this switching principle, even with permanently excited starter motors, immediate reactivation is prevented, since the induced voltage of the starter motor does not permit a full pull-in current.

An alternative is known for implementing the relay having a single winding and, after the pull-in, reducing the hold-in current using a current regulator or controller, for example, a two-point regulator or a pulse width modulation. However, such a relay must have a large winding, namely a winding having a high number of turns for the small hold-in current and/or made of a thick electrical conducting wire for a sufficient pull-in force.

Efforts have been made to introduce starting systems into vehicles, in which the activation of the starter motor and the activation of the meshing mechanism take place separately, to implement start-stop systems having a high availability of the internal combustion engine. In these start-stop systems, there are meshing strategies, according to which the starter pinion driven by the starter motor is first accelerated and, as much as possible, is meshed at a synchronous rotational speed with the ring gear of a coasting internal combustion engine.

Published European patent document EP 0 848 159 B1 describes a starting device having an electronic controller for start-stop operation, a starter motor and a starter relay being activatable separately to mesh a starter pinion with the ring gear of an internal combustion engine.

Published German patent application document DE 10 2006 011 644 A1 describes a starting device and a starting method for starting an internal combustion engine in a start-stop operating mode. According to a particular method, the starter pinion is meshable with a rotating ring gear of a coasting internal combustion engine at sufficiently approximated peripheral velocities. The meshing relay having a winding is energized with a current for meshing the pinion; the current for holding the starter pinion in the meshed state is basically reducible down to zero amperes.

A device for activating an electromagnetic switching element having a double winding and three semiconductor switches is known to the applicant. Rapid startup and shutdown procedures are implementable by forcing energizing in the same and opposing directions on the basis of certain switch positions with equal number of turns of the coils.

It is an object of the present invention to refine a switching device, a starting device, and a method for operating the switching device of the type mentioned at the outset in such a way that an operation of the armature is activatable as rapidly and easily as possible with low power consumption.

BRIEF SUMMARY OF THE INVENTION

It is a concept of the present invention to construct a switching device as efficiently as possible, in that a transformer effect is implemented using the switching device. For this purpose, the controller is designed having one switch in the current path in each case for activating each coil. The coils are therefore switchable independently of one another at least within certain limits. The advantage of this is that a power transfer between the two coils according to the transformer effect is utilized and therefore the use of the electrical power decreases. A further advantage is that the extinction power is less in relation to conventional switching devices having a pull-in winding and a hold-in winding as described at the outset, and a complex quenching circuit, e.g., a freewheel diode on the on switch of the switching device, which is designed as a relay, for example, in a starting device is also not necessary.

According to a preferred specific embodiment, a first coil is a pull-in winding and the second coil is a hold-in winding having an electromagnetic effect on the armature. This has the advantage that to retract the armature, either one or both windings may be energized, so that a more rapid retraction with a high starting power and a rapid switching speed is achieved. Energizing the hold-in winding using a significantly lower electrical power expenditure is sufficient to hold the armature in the retracted position, so that the pull-in winding may be shut down. A significant power savings thus results.

In order to design the switching device to be still more significantly efficient and achieve a greater current savings function, the coils preferably have different numbers of turns, in particular a difference of the number of turns greater than 3, the number of turns of the pull-in winding particularly preferably being greater than the number of turns of the hold-in winding. A particularly efficient pull-in winding is thus provided and the hold-in winding may be designed as needed with respect to the application.

In order to switch the coils completely independently of one another and to implement the transformer effect, the coils are each switchable separately, i.e., independently of one another, directly to the ground potential. An intermediate circuit or series circuit having a coil and/or the starter motor is basically not provided.

Advantages upon switching to ground potential are, inter alia, the electronic switches which may be implemented simply and therefore cost-effectively—so-called low-side switches. Disadvantages upon switching to battery positive potential are, inter alia, the electronic switches which are thus complex and therefore costly to implement—so-called high-side switches.

According to an alternative preferred specific embodiment, the coils are each switchable separately, i.e., independently of one another, to the battery positive pole potential. Switches on the battery positive pole potential have the advantage that the ground connections between the coils are implementable relatively easily, since only one connection is provided to the vehicle body or to the internal combustion engine, which is typically very simple and therefore significantly minimizes the wiring outlay. A further advantage is that the susceptibility to fault with respect to short-circuits may be decreased by a factor of approximately 10, in relation to switches on the ground potential. Short-circuits therefore occur significantly less.

According to a preferred alternative specific embodiment, to reduce the activation lines of the switching device, both coils are jointly activatable using one switch either on the battery positive pole potential or on the ground potential. The pull-in winding has a separate switch, which is force-coupled to the armature to shut down the energizing of the pull-in winding. Therefore, the energizing of the pull-in winding and the hold-in winding is controlled based on a simple mechanism. A complex electronic circuit for activating the pull-in winding is not necessary. The pull-in winding is deactivated when the armature is completely retracted and has closed a switch contact, for example, or when the complete retraction or the closing of a switch contact may still be reliably carried out. The changeover to the hold-in winding is only then carried out. The pull-in winding is thus shut down using a switch, which is preferably mechanically coupled to the armature. The wiring harness for such a switching device and the plugs and interfaces are therefore simplified and shortened.

The use of two coils in a switching device which is designed to execute a transformer effect additionally has the advantage that semiconductor switches, such as metal-oxide-semiconductor field-effect transistors, abbreviated as MOSFETs, may be used to activate the coils, without destroying them due to excessively high extinction power. The pull-in winding is preferably designed to be low-ohmic for a high current flow rate and the hold-in winding is preferably designed to be high-ohmic for low power consumption.

Upon the use of a single coil, in contrast, an elevated temperature may be reached at the MOSFET upon shutdown, which may reach several hundred degrees Celsius from the power loss. At such temperatures, the MOSFET may be destroyed.

During the switching use of two coils using an activation while utilizing the transformer effect, a power loss produces a final temperature which is advantageously significantly less than the maximum permitted semiconductor temperature. The MOSFET is therefore not impaired in its function and achieves a long service life.

The object of the present invention is also achieved by a starting device for an internal combustion engine, at least one above-described switching device being designed as a switch for energizing the starter motor. This has the advantage that the starter motor may be activated independently of the meshing procedure. The independent activation of the starter motor is important to mesh the pinion with the rotating ring gear of a coasting internal combustion engine according to a special operating mode during start-stop operation. Using the switching device as a switch for activating the starter motor has the advantage that the switching device may be activated easily, without having to implement a complex electronic starter motor activation, which is based, for example, on a reduction or a pulsed energization of the starting device. Such systems are known, for example, from DE 10 2006 011 644 A1. An increased power demand for a pull-in winding is therefore only required for startup of the switch, while the hold-in winding typically has a low power demand. Therefore, longer running times of the starter motor with little power loss are implementable for special start-stop strategies.

According to another preferred specific embodiment, the switching device is provided as a coupling device for meshing and demeshing a starter pinion driven by the starter motor with a ring gear of the internal combustion engine. Due to the implementation of the transformer effect in the switching device, this has the advantage that the meshing and demeshing are implementable using high switching speeds and less power is required for meshing and holding the starter pinion.

According to another preferred specific embodiment, the switching device is part of a controller of a current limiting device to activate the starter motor by varying the current. The starter motor is cranked via a current path using the current limiting device. Therefore, no sudden voltage drop or a significantly reduced voltage drop occurs at the voltage source, for example, the battery. The possible voltage drop is thus effectively minimized. By direct energization via a second current path while bypassing the current limiting device and shutting down the current path having the current limiting device, a maximum electrical power is supplied to the starter motor to start the internal combustion engine. The switching device according to the present invention as part of the activation in the current path having the current limiting device also has the advantage of switching rapidly and energy-efficiently and holding the switching state for an appropriately long time if necessary.

The object of the present invention is also achieved by a method for an electromagnetic switching device, in that each coil is activated in a separate current path using a switch designed in the controller in each case. A transformer effect may therefore be implemented on the electromagnetic switching device. A significantly lower extinction power is therefore required in relation to a conventional switching device having a pull-in winding and a hold-in winding, in which the pull-in winding is switched upstream from the starter motor. A quenching circuit, for example, in the form of a freewheel diode, according to the related art may also be omitted. Furthermore, the coils may have significantly different numbers of turns, since extinction by counter energizing is not provided, but rather solely a transfer of the power.

According to a preferred method, in particular to achieve still more rapid switching times, an elevated voltage is applied to the coils and one coil, in particular the pull-in coil, is energized as a function of time of the level of the elevated voltage. In particular from a voltage upper limit, only one coil is energized. This means that the voltage level is elevated in such a way that the energization of the second coil is reduced to zero with respect to time. This specific embodiment is advantageous if voltage sources having an elevated voltage are provided.

In order to be able to execute a simple error diagnosis of the switching device, a first coil is energized and voltages and currents are inductively detected and analyzed using the second and/or first coil. It may therefore be established, for example, where the armature is located or whether a coil is defective. Such methods are easily implementable, since the coils are activated by a controller, which is programmable using a microcomputer, for example. A current and voltage measuring device and a corresponding analysis device, which may be implemented by the microcomputer, are required in each case for this purpose.

It is understood that the above-mentioned features and features still to be explained hereafter are usable not only in the particular specified combination, but rather also in other combinations.

DETAILED DESCRIPTION OF THE INVENTION

Figure 1:
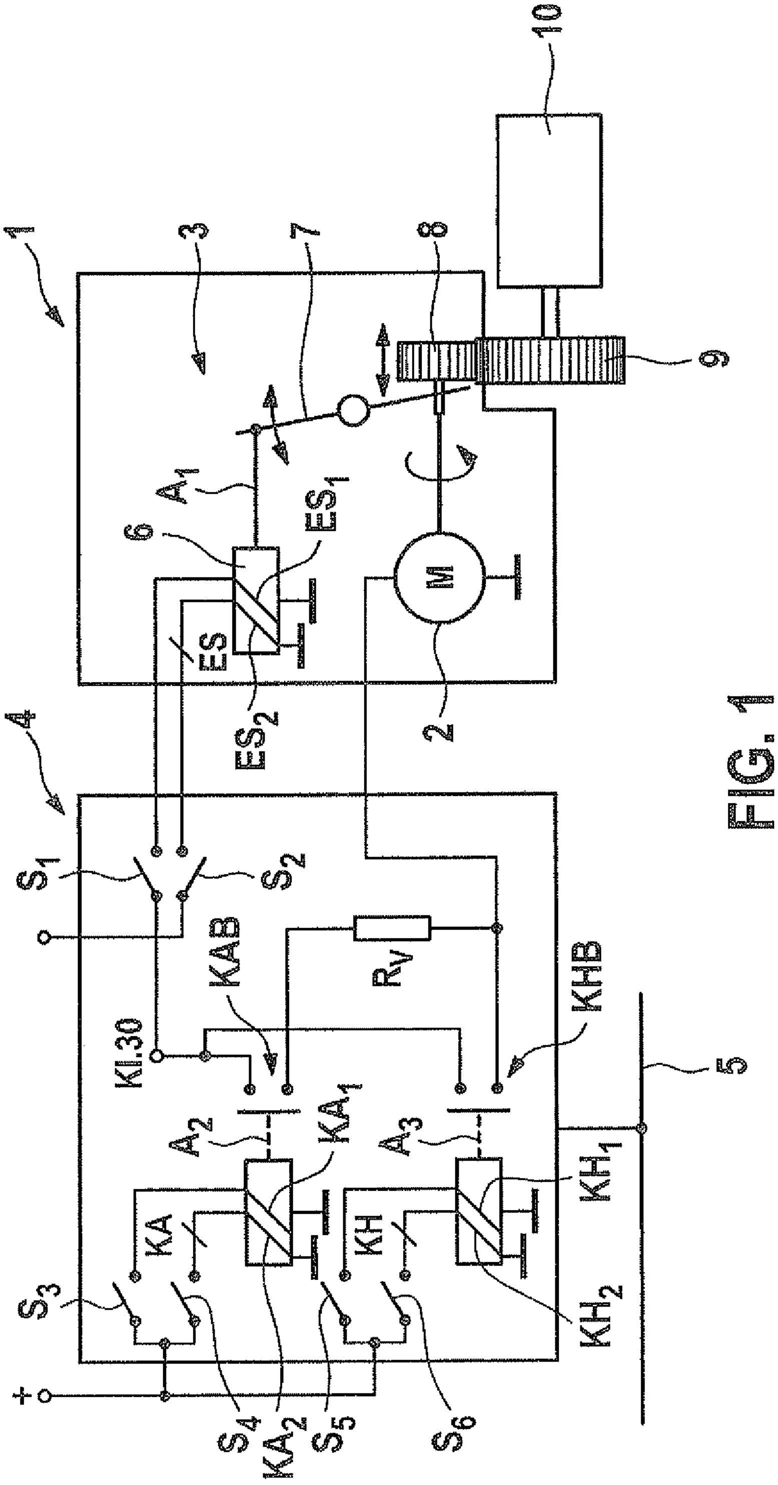
FIG. 1 shows a schematic circuit diagram of a starting device having three switching devices according to the present invention.

FIG. 1 shows a circuit diagram of a starting device 1 for an internal combustion engine of a motor vehicle. Starting device 1 includes a starter motor 2 having a coupling device 3 and a controller 4, which activates starter motor 2 and coupling device 3. Controller 4 includes a microcomputer (not shown) having a memory, which activates switches $S_1$ through $S_6$, shown in simplified form, in particular semiconductor switches, preferably in the form of metal-oxide field-effect transistors, abbreviated as MOSFETs, and which is in information contact, for example, via an internal-vehicle bus 5, with the engine controller and a contact switch on the ignition lock.

Starting device 1 according to FIG. 1 has three switching devices ES, KA, and KH according to the present invention in a particularly preferred specific embodiment. A first switching device ES is provided as actuator 6 in coupling device 3. Actuator 6 operates lever 7, which meshes a starter pinion 8 with a ring gear 9 of internal combustion engine 10.

Each switching device ES, KA, KH according to the present invention includes two coils, which are identified by $\text{index}_1$ and $_2$. The two $\text{coils}_1$ and $_2$ each act on a shared armature $A_1$, $A_2$, and $A_3$ in each switching device. Each $\text{coil}_{1,\ 2}$ is separately and directly connected to the ground potential of a vehicle battery, for example, via the vehicle body. Each $\text{coil}_{1,\ 2}$ is wired via a switch $S_1$ through $S_6$ separately to the positive pole, the battery positive pole potential according to the preferred circuit arrangement according to the present invention shown in FIG. 1. An electronically activatable switch $S_1$ through $S_6$ is situated in each current path of each coil. The advantages of such a circuit arrangement having switching devices ES, KA, KH are that $\text{coils}_{1,\ 2}$ are energizable independently of one another and therefore a transformer effect may be utilized on each switching device ES, KA, KH. Furthermore, it is important that a first $\text{coil}_1$ is designed as low resistance and a second $\text{coil}_2$ is designed as high resistance. A power transfer from one coil to the other is thus possible due to the transformer effect, as is known from a transformer when the low-resistance coil is turned off. The first coil and/or the second coil therefore no longer has/have to be extinct in a complex circuit, in order to rapidly resolve the magnetic effect for new switching procedures. For example, a free-wheel diode is not required on the switch. In addition, less power is consumed. The first coil is preferably a so-called pull-in winding and the second coil is a hold-in winding, which act on electromagnetically operable armature $A_1$, $A_2$, and $A_3$ for executing the movement. A large amount of power is required and used for a retraction, while in contrast to holding the armature in the retracted state, the power is transferred to the hold-in winding, which only requires little additional power. The switching device may therefore be operated more efficiently having shorter startup and shutdown times. The currents on the pull-in winding are, for a switching device KA and KH designed as a switching actuator, for example, less than 25 A (ampere) and the currents on the hold-in winding are less than 7 A. If switching device ES is used as a meshing actuator, higher currents of up to 35 A are required for the pull-in winding.

Due to the transformer effect, the power is transferred upon shutdown of the pull-in winding to the hold-in winding and dissipated thereon. Upon shutdown of the hold-in winding, only a small amount of electrical power is still to be dissipated. A quenching circuit is therefore either no longer required at all or only in a greatly simplified form.

Due to the interacting coils, a diagnosis is possible through state analyses with the aid of the detection and analysis of currents and voltages on one coil while simultaneously energizing the other coil. The position or movement of the armature or a fault on the coils may be established.

Switching device KA electromagnetically switches a contact bridge KAB and is therefore an electromagnetic relay, in order to slightly crank starter motor 2 using a reduced current, which is limited via a current limiting device $R_V$, so as not to excessively load a battery or a vehicle electrical system during starting, for example, and to minimize a voltage drop.

With the aid of switching device KH, a maximum current is applied to starter motor 2 by electromagnetically closing a contact bridge KHB, after the starter motor has cranked. This maximum current is required, for example, for starting internal combustion engine 10. The otherwise usual high, undesirable voltage drop is minimized, since starter motor 2 has already been accelerated to a predetermined speed.

Figure 2:
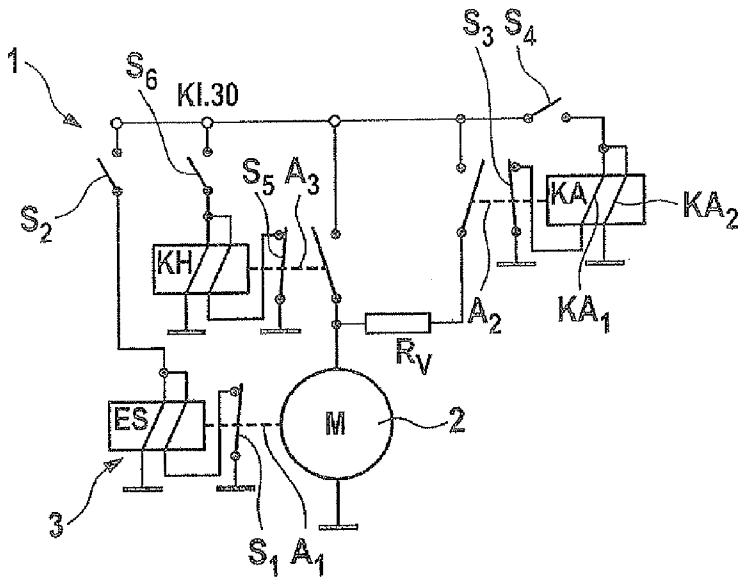
FIG. 2 shows a schematic circuit diagram of an alternative starting device according to the present invention.

FIG. 2 shows a specific embodiment modified from FIG. 1, in which each switch $S_1$, $S_3$, $S_5$ of pull-in winding $ES_1$, $KA_1$, $KH_1$ is switched in each case by switching device ES, KA, KH directly to the ground potential of the battery. In addition, each switch $S_1$, $S_3$, $S_5$ is force-coupled to armature $A_1$, $A_2$, $A_3$, to shut down the energization of pull-in winding $ES_1$, $KA_1$, $KH_1$. The wiring outlay is thus minimized, since only one switch $S_2$, $S_4$, $S_6$ situated on the positive pole side is required for turning on both coils. The shutdown of pull-in winding $ES_1$, $KA_1$, $KH_1$ is carried out quasi-automatically by moving particular armature $A_1$, $A_2$, $A_3$. No electronic controller is required for this purpose. This forced controller is implemented on coupling device 3, on switching device KH for directly energizing starter motor 2, and on switching device KA, which cranks starter motor 2 via a current path having a specific limiting device $R_V$. All switching devices ES, KA, KH are activatable via electronically activatable switches $S_1$, $S_3$, and $S_5$ in controller 4. The peripheral delimitation in the form of a rectangle of controller 4 has not been shown in FIG. 2 for reasons of simplification.

Figure 3:
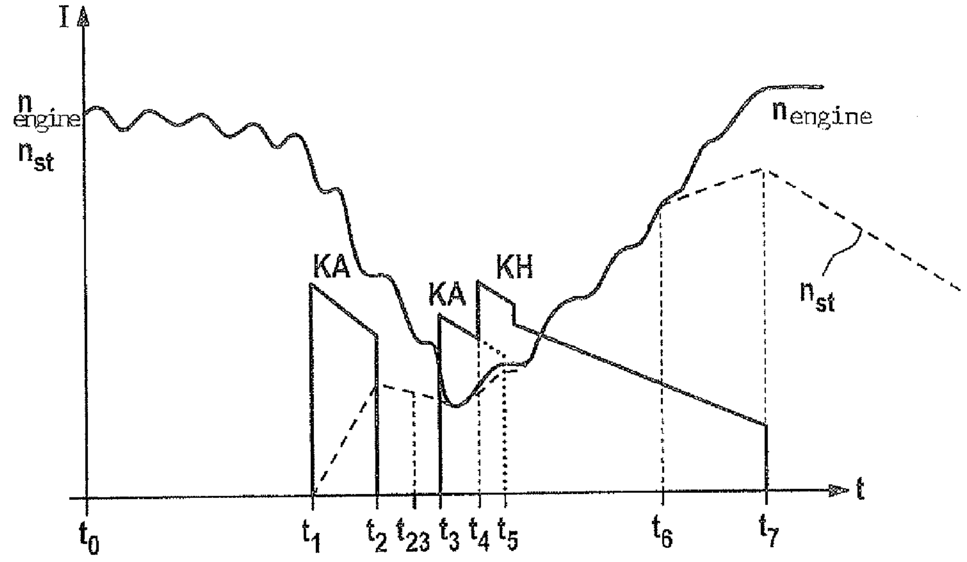
FIG. 3 shows a time-current-speed graph of a method sequence during start-stop operation.

FIG. 3 shows, in a time-current-speed diagram, a time curve of a particular start-stop operating sequence of internal combustion engine 10 and starting device 1. FIG. 3 shows a particular operating mode, according to which starter pinion 8 is accelerated to a certain rotational speed and meshed with rotating, coasting ring gear 9 of internal combustion engine 10. Beginning from a point in time $t_0$, speed $n_{engine}$ of internal combustion engine 10 runs down in a characteristic speed wave movement due to the compression and decompression behavior of the individual cylinders having speed wave valleys and peaks. This is shown by characteristic curve $n_{engine}$. At a defined point in time, for example, immediately after a shutdown signal has been sent out for internal combustion engine 10, electromagnetic switching device KA is operated, so that starter motor 2 is energized via power limiting device $R_V$, and starter motor 2 is accelerated up to point in time $t_2$ to an established speed. The power consumption of switching device KA decreases continuously from point in time $t_1$ to point in time $t_2$. The power consumption is significantly reduced by the use of a pull-in winding $KA_1$ and a hold-in winding $KA_2$. Contact bridge KAB of switching device KA is opened at point in time $t_2$, so that starter motor 2 is no longer energized.

Speed $n_{St}$, of starter motor 2 slowly decreases up to a precalculated point in time $t_3$, at which the peripheral velocities of starter pinion 8 and ring gear 9 are approximately equal within a certain tolerance range. At a defined, precalculated point in time $t_{23}$ between $t_2$ and $t_3$, switching device ES is energized, so that starter pinion 8 is meshed with coasting ring gear 9 approximately at point in time $t_3$. Contact bridge KAB is simultaneously closed by switching device KA by energizing double coils $KA_1$, $KA_2$. At point in time $t_4$, the direct current path from the positive potential of the battery of starter motor 2 is closed by closing contact bridge KHB with the aid of switching device KH. At point in time $t_5$, switching device KA is no longer energized. Starter motor 2 now transmits the maximum electrical power to ring gear 9 of internal combustion engine 10 in order to restart it. From a point in time $t_6$, internal combustion engine 10 runs on its own and does not require starter motor 2, so that at point in time $t_7$, contact bridge KHB on switching device KH is opened again. Hold-in winding $ES_2$ of switching device ES is no longer energized, with the result that starter pinion 8 demeshes from ring gear 9. Starter motor 2 reaches its speed maximum at point in time $t_7$ and then runs down.

All double coils in all switching devices ES, KA, and KH are activated according to the following method. At first, the pull-in winding and the hold-in winding are energized. In a second step, the pull-in winding is shut down and the power is transferred to the hold-in winding via a shared core. The effect of the pull-in winding is thus essentially extinct. In a third step, the hold-in winding is shut down, and the power is dissipated in the form of heat on the semiconductor switch as a power loss.

The advantage of switching devices ES, KA, and KH according to the present invention having two $coils_{1,\ 2}$ in relation to a single winding is that after the retraction of armature $A_1$, $A_2$, $A_3$, a complex activation, for example, in the form of a current regulator or a current controller, for example, via a time regulator or a pulse width modulation, for generating a hold-in current is omitted. In addition, to achieve a high pull-in force, a large winding is required, which implements a high flow rate using a high number of turns and is simultaneously designed for small hold-in currents. The result is thus typically winding wires having a high number of turns. High inductances are connected thereto, which result in a high level of strain of the activation, in particular when it is turned on and therefore also in the event of regulation using many switching procedures.

The double winding principle described at the outset, which is known from the related art, having a pull-in coil in the current path of the starter motor, necessarily requires an equal number of turns of pull-in winding and hold-in winding, since otherwise due to the induced voltage applied to so-called terminal 45, i.e., at the starter motor, a shutdown may no longer take place. The pull-in winding and hold-in winding therefore mutually extinguish one another during the shutdown through short-term energization in the opposite direction.

In contrast, the switching device having the double winding in the circuit arrangement according to the present invention has multiple advantages, which will be explained in greater detail on the basis of the following figures.

Figure 4:
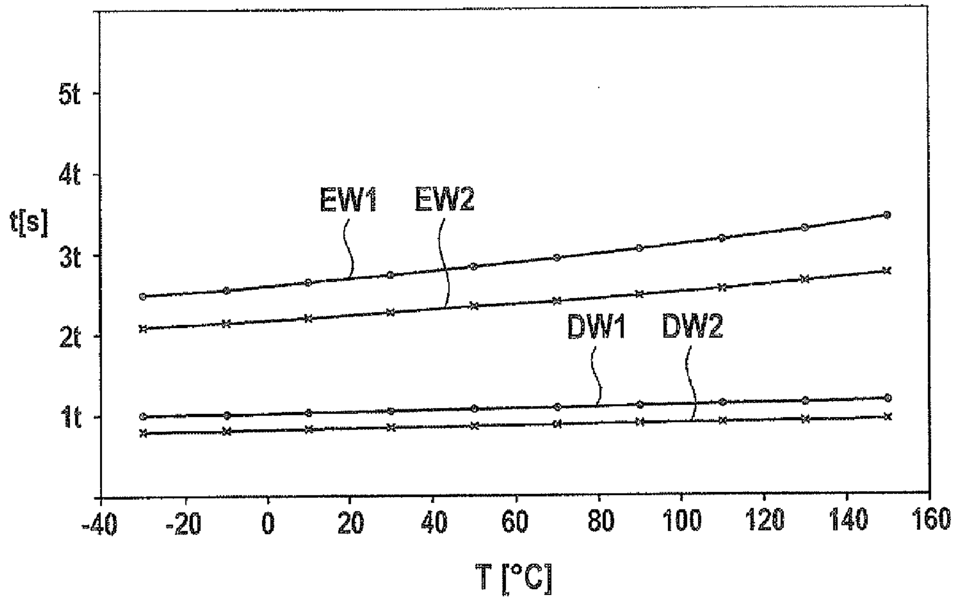
FIG. 4 shows a graph having startup times for a single and double winding with respect to various temperatures.

FIG. 4 shows a comparison of a switching device, once with a single winding and once with a double winding, in each case with applied battery potential, which corresponds to the standard application, and with twice as high a battery potential, for example, of 24 V, for example, as a function of actual temperatures of the coils. The startup times of a switching device having a double winding with the usual battery potential from the standard application are shown by characteristic curve DW1. The startup times with a high battery potential, for example, of approximately 20 V, are shown by characteristic curve DW2. The switching time only changes minimally. In contrast, with a single winding, shown by characteristic curves EW1 and EW2, the startup times are significantly longer, as a function of the temperature of the winding, and at a higher battery potential, the switching-on times are reduced significantly and therefore display a greater sensitivity in relation to the variance of the battery potential, and thus greater tolerances.

Figure 5:
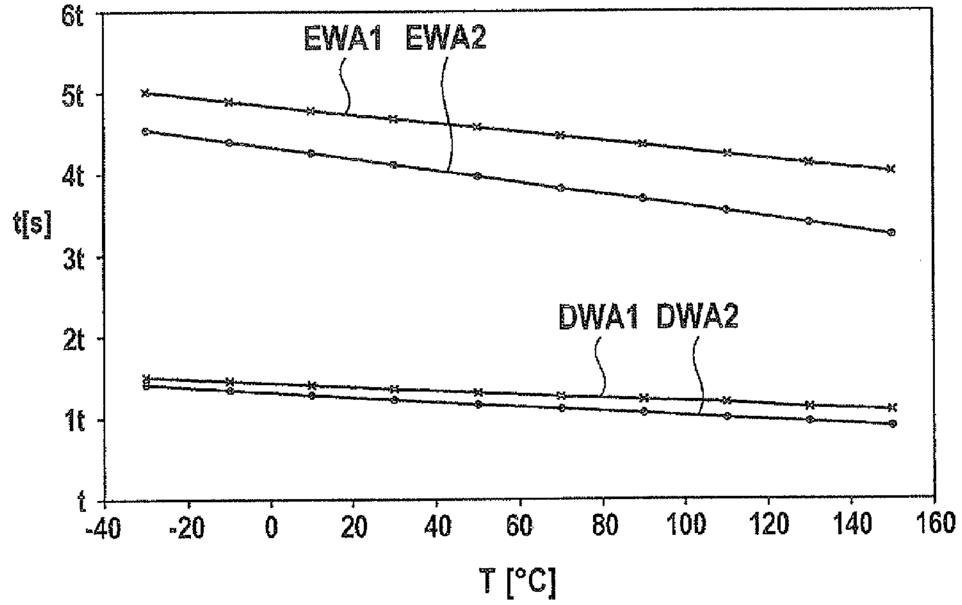
FIG. 5 shows a graph of shutdown times using a single and a double winding with respect to various temperatures.

FIG. 5 shows the shutdown times, again of the single winding and the double winding, as a function of the temperature of the windings. With increasing temperature, the shutdown time basically decreases. Significantly shorter shutdown times also result with the double winding. The shutdown time is slightly shorter at a high battery potential. This is shown by characteristic curves DWA1 and DWA2. For comparison, characteristic curves EWA1 and EWA2 of a switching device having a single winding are shown. These characteristic curves display significantly longer shutdown times for a high battery potential, and according to characteristic curve EWA2, a shorter switching time and therefore a greater sensitivity in relation to the variance of the battery potential, and thus significantly higher tolerances.

Figure 6A:
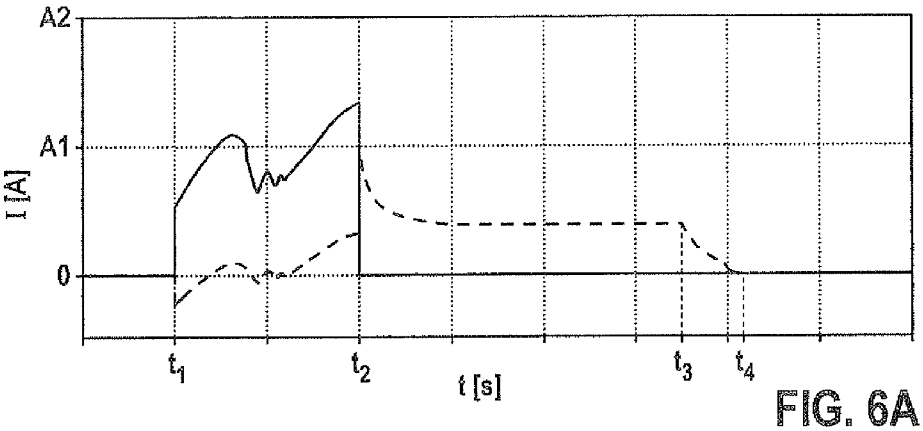
FIG. 6 shows a current-temperature curve of an activation with the aid of MOSFETs of a switching device according to the present invention.

FIGS. 6A, B, C show current-voltage-temperature-armature travel graphs over time in the case of an activation of switching devices ES, KA, and KH according to the present invention with the aid of MOSFETs. FIG. 6A shows, over a period of time $t_1$ in the millisecond range, the current curve of the pull-in winding and the hold-in winding over time t. At point in time $t_1$, a current between 8 A and 15 A is applied to the pull-in winding up to point in time $t_2$, since the pull-in winding is designed as low resistance. The hold-in winding has a higher ohmic resistance and only absorbs a small current, which is partially also negative, between points in time $t_1$ and $t_2$. The hold-in winding has a significantly higher internal resistance than the meshing winding and therefore smaller currents, for example, by a factor ~4.5. A negative voltage accordingly arises. Field changes, which correspond to a power change, induced by current changes in one coil are compensated for as much as possible in a coupled magnetic circuit by the transformer effect by the second coil. This partially results in negative currents in the hold-in winding, which may not be completely compensated for the field changes through the different turn ratios of the two coils, however. Vice versa, upon the shutdown of the pull-in winding by increasing the current in the hold-in winding, the reduction of the magnetic field is partially compensated for.

At point in time $t_2$, the pull-in winding is shut down and the electrical power of the pull-in winding is transferred due to the transformer effect to the hold-in winding, which flows at a low hold-in current up to a point in time $t_3$. At point in time $t_3$, the hold-in winding is shut down via the electronic MOSFET switch and the current decays completely up to point in time $t_4$, so that current no longer flows through the hold-in winding. FIG. 6A shows that the hold-in winding and the meshing winding manage with a small current for switching and shutdown. The electrical power is therefore used more efficiently by implementation of the transformer effect than previously known in the related art. The switching device may therefore be activated simply without complicated regulation or pulsing. A quenching circuit is implemented not at all or only in very simplified form due to the transformer effect. As shown in FIGS. 4 and 5, the startup and shutdown time are reduced. A further advantage of the switching device is that a significantly smaller power consumption is necessary, even at a high load of starter motor 2, for example, because it has been accelerated in start-stop operation to a certain speed and, using the switching device, a starter pinion 8 is meshed with ring gear 9. Switching device ES is therefore used as a meshing relay. Through the use of the double winding, even with a starting aid of, for example, 24 V, through a series circuit of two conventional 12 V batteries, for example, in so-called "jump-start cases," activation may take place without a high current and high extinction power.

Figure 6B:
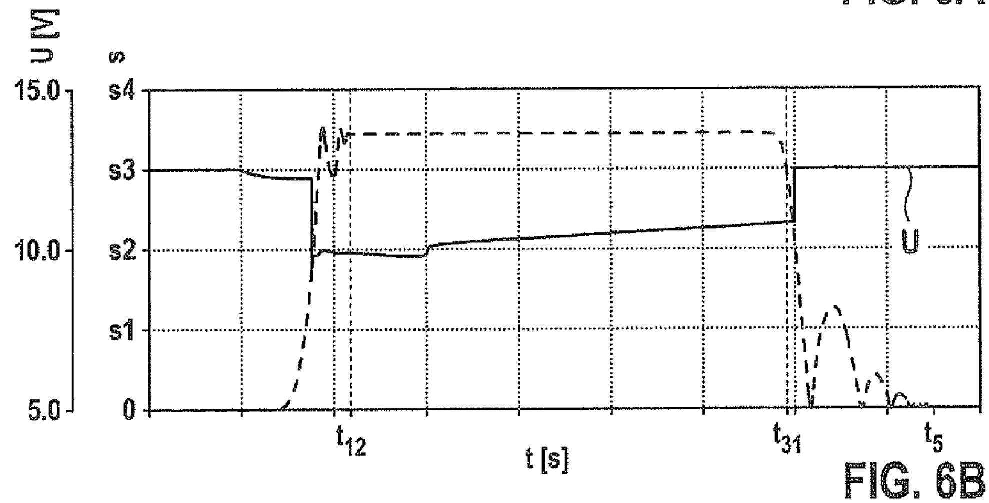

FIG. 6B shows, using a dashed line, the travel of armature $A_1$, $A_2$, $A_3$ with respect to time between points in time $t_1$ through $t_4$ described in FIG. 6A. At a point in time $t_{12}$ between $t_1$ and $t_2$, active armature $A_1$, $A_2$, $A_3$ is completely retracted. Somewhat delayed in time after point in time $t_3$ at point in time $t_{31}$, armature $A_1$, $A_2$, $A_3$ leaves the position, so that it is back in the unenergized state position at point in time $t_5$.

In FIG. 6B, voltage U is additionally shown, which displays the basic voltage curve during starting of an internal combustion engine. A drop of voltage U occurs due to the startup of the starter motor via the relay and the high power consumption of the starter motor in short-circuit operation with a stationary rotor. After the starter motor cranks, its power consumption is reduced and voltage U therefore rises in parallel. After a shutdown of the relay and therefore the starter motor, the power consumption from voltage source U drops significantly and voltage U jumps back to the original starting value.

Figure 6C:
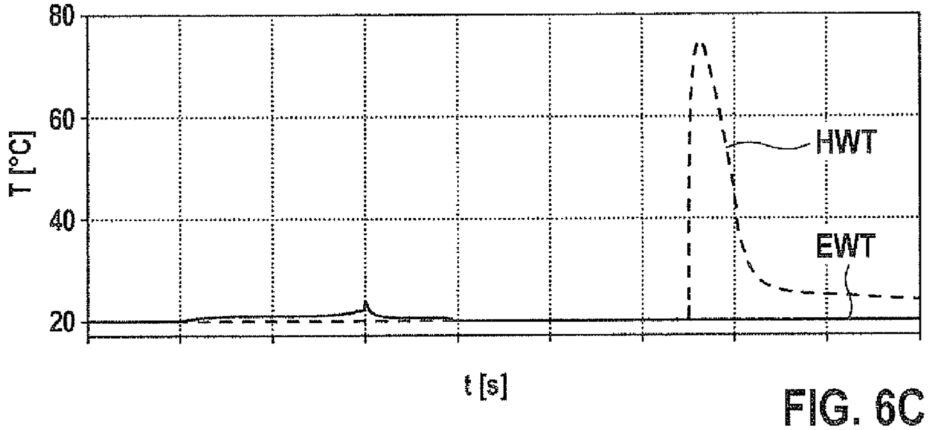

FIG. 6C indicates, using a solid line EWT, the temperature on the barrier layer, the so-called junction temperature, of particular electronic switch $S_1$ through $S_6$ of the pull-in winding. Dashed line HWT shows the barrier layer temperature at the MOSFET switch of the hold-in winding. FIG. 6C clearly shows that at point in time $t_2$, at which the pull-in winding is shut down, the temperature increases by a few degrees Kelvin due to a lower power dissipation in the MOSFET, since most of the power of the pull-in coil is transferred into the holding coil. Therefore, practically no load of the switching MOSFETs occurs. At point in time $t_3$, when the hold-in winding is shut down, a power loss occurs at the barrier layer, which increases the temperature of the MOSFET switch by approximately 40 to 50 degrees Kelvin here, for example. The temperature then drops rapidly again. The MOSFET switch may cope with such a temperature increase without significantly worsening the service life.

Figure 7A:
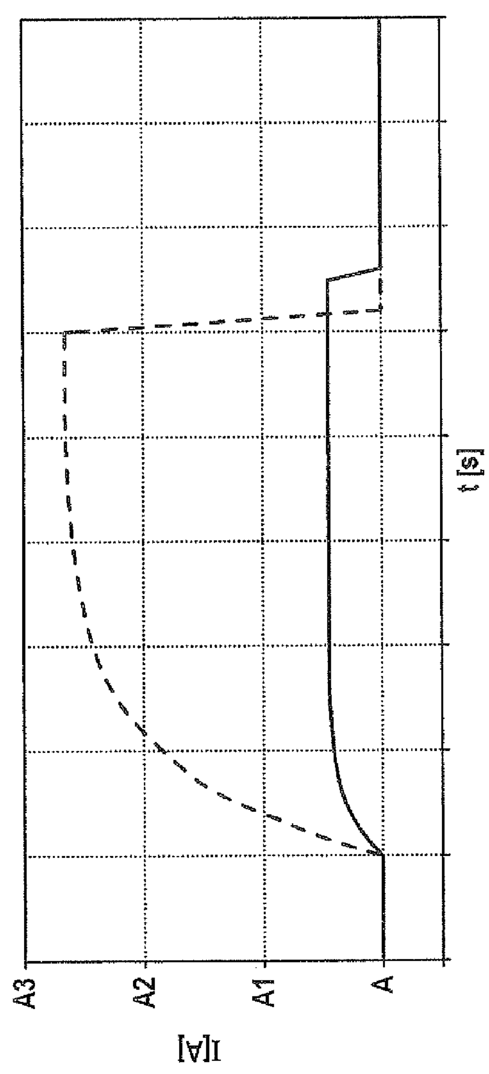
FIG. 7 shows a current-temperature curve of an activation with the aid of MOSFETs having a double coil and a circuit according to the related art.
Figure 7B:
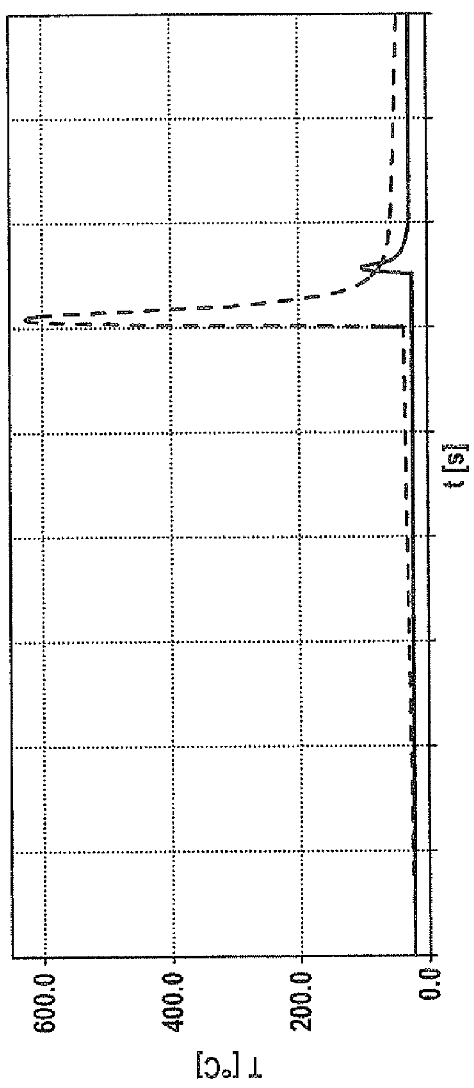

FIG. 7 shows, in a comparison to FIG. 6, the current-temperature curve of MOSFETs during startup and shutdown of individual windings using a circuit according to the related art, the solid characteristic curve being the characteristic curve of a hold-in winding and the dashed line being the characteristic curve of a pull-in winding. In this example, the magnetic fields of the individual windings are not linked and are therefore not coupled as a transformer. Due to the lack of transformer coupling, the power may not be transferred to the holding coil upon shutdown of the pull-in coil. Therefore, temperature increases of several hundred degrees Celsius are to be expected, which may destroy the MOSFETs very rapidly. The dashed line also corresponds to the current flow of a coil having a single winding at a high current level and a high shutdown power, which again causes a high semiconductor temperature in the MOSFETs.

All figures merely show schematic illustrations which are not to scale. Moreover, reference is made in particular to the illustrations in the drawings as essential for the present invention.

What is claimed is:

1. A switching device, comprising:

an electromagnetic switching element including two coils on one core, wherein the two coils act on a shared armature, wherein the first coil is a pull-in winding and the second coil is a hold-in winding which electromagnetically act on the shared armature;

at least two switches corresponding to the two coils; and a controller configured to selectively control each switch to be in the current path of the corresponding coil to activate the corresponding coil;

wherein the switch of the pull-in winding is force-coupled to the armature for shutdown of energization of the pull-in winding.

2. The switching device as recited in claim 1, wherein the number of turns of the pull-in winding is greater than the number of turns of the hold-in winding by at least three.

3. The switching device as recited in claim 2, wherein the two coils are each separately switchable to the ground potential.

4. The switching device as recited in claim 2, wherein the two coils are each separately switchable to the battery potential.

5. A method for operating an electromagnetic switching device having (i) an electromagnetic switching element including two coils on one core, wherein the two coils act on a shared armature, (ii) at least two switches corresponding to the two coils, and (iii) a controller configured to selectively control each switch, the method comprising:

selectively activating, by the controller, each coil in a separate current path using the corresponding switch to act on the shared armature;

wherein an energization voltage is applied to the coils, and wherein only one coil is energized as a function of time by a voltage upper limit of the energization voltage.

6. The method as recited in claim 5, wherein a first coil is energized by the energization voltage, and wherein at least one of a voltage and a current is detected and analyzed using at least one a second coil and the first coil.

* * * * *